US008799902B2

(12) United States Patent  
Illikkal et al.

(10) Patent No.: US 8,799,902 B2  
(45) Date of Patent: Aug. 5, 2014

(54) PRIORITY BASED THROTTLING FOR POWER/PERFORMANCE QUALITY OF SERVICE

(75) Inventors: Ramesh Kumar Illikkal, Portland, OR (US); Ravishankar Iyer, Portland, OR (US); Jaideep Moses, Portland, OR (US); Don Newell, Portland, OR (US); Tryggve Fossum, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 1636 days.

(21) Appl. No.: 11/786,019

(22) Filed: Apr. 9, 2007

(65) Prior Publication Data

US 2008/0250415 A1    Oct. 9, 2008

(51) Int. Cl.
| | | |
|---|---|---|
| *G06F 9/46* | (2006.01) | |
| *G06F 1/00* | (2006.01) | |
| *G06F 1/26* | (2006.01) | |
| *G06F 1/32* | (2006.01) | |
| *G06F 15/173* | (2006.01) | |

(52) U.S. Cl.  
USPC ........... 718/100; 718/102; 718/104; 718/105; 709/223; 709/224; 709/226; 713/300; 713/320; 713/322; 713/323; 713/324

(58) Field of Classification Search  
None  
See application file for complete search history.

(56) References Cited

U.S. PATENT DOCUMENTS

| | | | | |
|---|---|---|---|---|
| 5,918,057 A | * | 6/1999 | Chou et al. .................... 710/260 |
| 6,016,503 A | * | 1/2000 | Overby et al. ................ 718/104 |
| 6,141,762 A | | 10/2000 | Nicol et al. |
| 6,148,324 A | * | 11/2000 | Ransom et al. ............... 718/105 |
| 6,269,390 B1 | * | 7/2001 | Boland ......................... 718/100 |
| 6,473,780 B1 | * | 10/2002 | Barcelo ........................ 718/103 |
| 6,477,562 B2 | * | 11/2002 | Nemirovsky et al. ......... 718/108 |
| 6,567,839 B1 | * | 5/2003 | Borkenhagen et al. ....... 718/103 |
| 6,813,665 B2 | * | 11/2004 | Rankin et al. ................. 710/260 |

(Continued)

FOREIGN PATENT DOCUMENTS

| | | |
|---|---|---|
| JP | 2001-109661 | 4/2001 |
| JP | 2001-331461 A | 11/2001 |

(Continued)

OTHER PUBLICATIONS

Pending, not yet published, U.S. Appl. No. 11/503,633, filed Aug. 14, 2006 to Zhao et al.  
Pending, not yet published, U.S. Appl. No. 11/527,222, filed Sep. 25, 2006 to Illikkal et al.

(Continued)

*Primary Examiner* — Charles Swift  
(74) *Attorney, Agent, or Firm* — Blakely, Sokoloff, Taylor & Zafman LLP

(57) ABSTRACT

A method and apparatus for throttling power and/or performance of processing elements based on a priority of software entities is herein described. Priority aware power management logic receives priority levels of software entities and modifies operating points of processing elements associated with the software entities accordingly. Therefore, in a power savings mode, processing elements executing low priority applications/tasks are reduced to a lower operating point, i.e. lower voltage, lower frequency, throttled instruction issue, throttled memory accesses, and/or less access to shared resources. In addition, utilization logic potentially trackes utilization of a resource per priority level, which allows the power manager to determine operating points based on the effect of each priority level on each other from the perspective of the resources themselves. Moreover, a software entity itself may assign operating points, which the power manager enforces.

19 Claims, 4 Drawing Sheets

(56) References Cited

U.S. PATENT DOCUMENTS

| | | | |
|---|---|---|---|
| 7,000,072 B1 | 2/2006 | Aisaka et al. | |
| 7,191,349 B2* | 3/2007 | Kaushik et al. | 713/323 |
| 7,464,380 B1* | 12/2008 | Hempel | 718/102 |
| 7,761,720 B2* | 7/2010 | Kaushik et al. | 713/300 |
| 2003/0023889 A1* | 1/2003 | Hofstee et al. | 713/322 |
| 2005/0154860 A1* | 7/2005 | Arimilli et al. | 712/216 |
| 2005/0188373 A1 | 8/2005 | Inoue et al. | |
| 2006/0037020 A1* | 2/2006 | Accapadi et al. | 718/102 |
| 2006/0064692 A1* | 3/2006 | Sanchez et al. | 718/100 |
| 2006/0069874 A1 | 3/2006 | Desai | |
| 2006/0259799 A1* | 11/2006 | Melpignano et al. | 713/300 |
| 2007/0043964 A1* | 2/2007 | Lim et al. | 713/322 |
| 2007/0169127 A1* | 7/2007 | Kashyap | 718/104 |

FOREIGN PATENT DOCUMENTS

| | | |
|---|---|---|
| JP | 2003-256067 | 9/2003 |
| JP | 2005-285093 | 10/2005 |
| WO | 2008/124455 A2 | 10/2008 |
| WO | 2008/124455 A3 | 12/2008 |

OTHER PUBLICATIONS

International Preliminary Report on Patentability received for PCT Application No. PCT/US2008/059172, Mailed on Oct. 22, 2009, 5 pages.

International Search Report and Written Opinion received for PCT Application No. PCT/US2008/059172, Mailed on Sep. 30, 2008, 9 pages.

* cited by examiner

PRIORITY BASED THROTTLING FOR POWER/PERFORMANCE QUALITY OF SERVICE

FIELD

This invention relates to the field of processors and, in particular, to providing Quality of Service (QoS) in a computer system.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of processing resources, such as cores, threads, and/or logical processors.

In processors with multiple threads, the behavior of one thread potentially affects the behavior of another thread on the same processor core due to sharing of resources, such as caches, memory, and power. Often behavior of one thread creates unfairness in the usage of the shared resources and pipelines. In fact, when one thread's performance significantly changes in relation to other threads on the same core, often a large and unpredictable variability in performance from the unbalanced usage of shared resources occurs.

As a result, one thread or core executing a low priority application potentially adversely affects the performance of a core or thread executing a higher priority application. For example, a background application, such as virus scan, may be executing on a first core utilizing enough shared resources to adversely affect the performance of a second core, which is executing a foreground application. Previously, throttling of voltage and frequency has been utilized to save power. However, these efforts typically involve throttling threads or cores without regard to priority of current application, virtual machines, or operating system tasks. In contrast, some efforts have focused on partitioning of resources to provide quality of service to all applications. Yet, partioning without regard to priority or power consumption potentially causes adverse performance and power usage.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific resources, specific logic to track utilization of resources, specific communication of application priority, etc. in order to provide a thorough understanding of the present invention. It will be apparent, however, to one skilled in the art that these specific details need not be employed to practice the present invention. In other instances, well known components or methods, such as microprocessor architecture, virtual machine monitors/machines, power/clock gating/modulation, and specific operational details of known logic, have not been described in detail in order to avoid unnecessarily obscuring the present invention.

The method and apparatus described herein are for throttling power and/or performance of processing elements based on a priority of software entities associated with the processing elements. Specifically, throttling based on priority is primarily discussed in reference to multiple cores in a virtualization environment. However, the methods and apparatus for throttling based on priority are not so limited, as they may be implemented on or in association with any integrated circuit device or system, such as cell phones, personal digital assistants, embedded controllers, mobile platforms, desktop platforms, and server platforms, as well as in conjunction with any type of processing element, such as a core, hardware thread, software thread, or logical processor, or other processing resource. In addition, throttling based on priority may take place in any hardware/software environment, such as a traditional operating system or a hypervisor executing on hardware.

Figure 1:
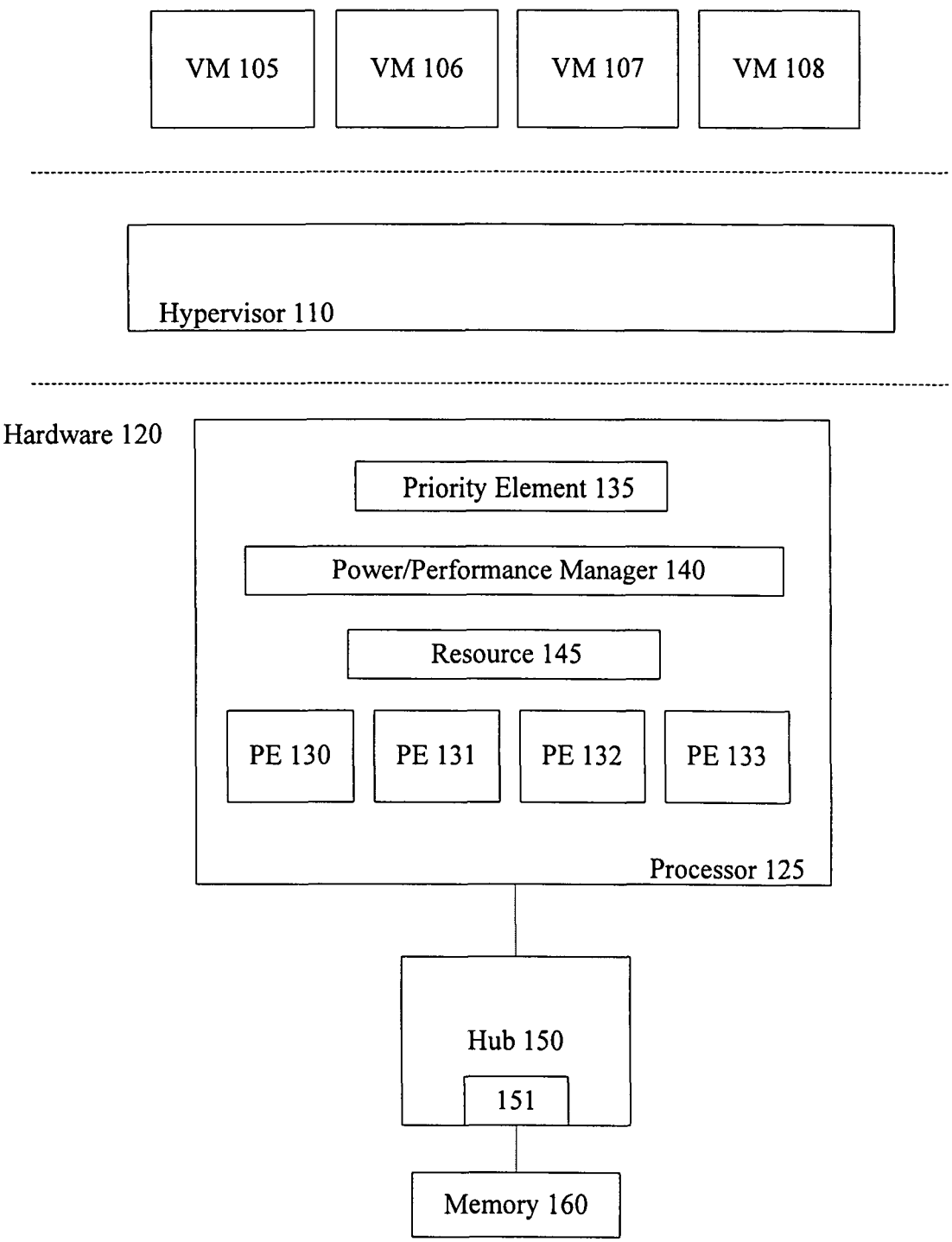
FIG. 1 illustrates an embodiment of a multi-processing element including a priority manager to set operating points of processing elements based on associated application priority.

Referring to FIG. 1, an embodiment of a processor capable of throttling processing elements based on a priority of software entities associated with the processing elements is illustrated. Hardware 120 includes processor 125, hub 150, and memory 160. Hub 125 includes any device for communication between processor 121 and memory 130, such as a memory controller hub or chipset. Note that hub 125 may be integrated in processor 121 or memory 130. Memory 160 may be dedicated to processor 125 or shared with other devices in a system. Examples of memory 160 includes dynamic random access memory (DRAM), static RAM (SRAM), non-volatile memory (NV memory), and long-term storage.

Typically, processor 125 includes input/output (I/O) buffers to transmit and receive bus signals on an interconnect. Examples of the interconnect include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol.

Processor 125 includes multiple processing elements, such as processing elements 130-133. A processing element refers to a thread, a process, a context, a logical processor, a hardware thread, a core, and/or any processing element, which shares access to other shared resources of the processor, such as reservation units, execution units, and higher level caches/memory. A processing element may also be referred to as a thread unit, i.e. an element which is capable of having instruction independently scheduled for execution by a software thread. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources.

As can be seen, when certain processing resources are shared and others are dedicated to an architectural state, the line between the nomenclature of a hardware thread and core overlaps. Yet often, a core and a hardware thread are viewed by an operating system or management software as individual logical processors, where the software is able to individually schedule operations on each logical processor. In other words, software views two cores or threads on a physical processor as two independent processors. Additionally, each core potentially includes multiple hardware threads for executing multiple software threads. Therefore, a processing element includes any of the aforementioned resources capable of maintaining a context, such as cores, threads, hardware threads, or other elements.

Hypervisor 110 is to provide an interface between software, such as virtual machines (VMs) 105-107, and hardware, such as hardware 120. Often a hypervisor abstracts hardware 120 to allow multiple virtual machines and/or guest applications to run independently on hardware 120. Virtual machines 105-107 may be an operating system, an application, guest software, or other software to be executed on hardware 120. Although a virtualization environment is illustrated, hardware 120 may be present in other firmware and software environments, such as a traditional operating system executing on hardware 120. As a result, any task, software program, application, user-level application, guest software, operating system, virtual machine, virtual machine monitor, or other executable code capable of being assigned a priority is referred to as a software entity.

In one embodiment, processing elements (PEs) 130-133 are associated with software entities. As a first example, software entities, such as hypervisor 110 and virtual machines 105-108 are directly assigned to PEs 130-133 or PEs PEs 130-133 are dedicated to executing hypervisor 110 and virtual machines 105-108. As another example, software entities are associated with PEs 130-133 simply through execution by PEs 130-133 of code/tasks for the software entities. Examples of processing elements 125, as stated above, include a core, a thread, a context, a logical processor, and a combination thereof.

In one embodiment, an operating point of a processing element, such as processing element 130, is set based on a priority level of a software entity associated with processing element 130. An operating point of a processing element refers to a rate/power level of the processing element, an allocation/performance level of a resource made available to the processing element, or a combination thereof. As one example, an operating point of a processing element is changed by modifying resources, such as clocks, frequency, voltage, or power to alter the rate of a processing element. These different power and frequency states are often referred to as P-states or T-states, which are illustrative examples of operating points. In addition, other rate mechanisms such as the rate of instruction issue and memory access issue may be altered for different operating points.

As an additional example, an operating point of a processing element is changed by modifying allocation of shared resources, such as memory, memory bandwidth, caches, fetch hardware, decode hardware, out-of-order hardware, reservation hardware, and any other logic/hardware utilized by the processing element. Therefore, an operating point of a processing element includes any combination of a rate of the processing element and allocation of shared resources available to the processing element. In other words, an operating point may include allocation/performance of a shared resource, such as a cache, as well as a rate level, such as a voltage and frequency, of a processing element.

To illustrate, assume a first operating point of processing element 130 includes full power/voltage, full clock/frequency, access to all the ways of a shared cache, and uninhibited tokens/credits for access to memory, while a second operating point of processing element 130 includes a reduced voltage/power, reduced clock frequency, access to only a portion of the shared cache, and inhibited tokens/credits for access to memory. Although this example is purely illustrative, it demonstrates that an operating point may include any combination of resources at a specified level.

Priority aware manager 140 is to receive a priority level of a software entity associated with processing element 130 and is to modify an operating point of processing element 130 based on the priority level. In one embodiment, priority aware manager 140 is to determine an operating point for processing element 130 based on the priority level. For example, assume virtual machine (VM) 105 is virus scan software to be run in the background, which is assigned a low priority, and VM 105 is to be executed utilizing PE 130. Here, the priority of VM 105 is stored in priority storage element 135 to indicate the priority level of VM 105. Alternatively, the priority level of PE 130 may be held in priority element 135, as it is tasked with executing VM 105. Based on the low priority of VM 105, which is associated with PE 130, manager 140 modifies an operating point of PE 130 to a low operating point. As noted above the lower operating point may include a combination of a lower rate of PE 130, such as a lower voltage, a lower frequency, or a lower power, as well as a reduced access to shared resource, such as access to a reduced number of ways of a cache.

To further the example, assume hypervisor 110 is a high priority application scheduled for execution on PE 133. Manager 140, based on the high priority held in priority element 135 for hypervisor 110 and PE 133, sets an operating point of PE 133 to a higher operating point, such as a higher voltage, higher frequency, and/or increased access to shared resources, as compared to the operating point of PE 130. Other examples of operating points, such as allocation of cache and memory bandwidth levels, are discussed below in reference to FIGS. 2 and 3. An operating point may be set or modified through any known method for altering resources or modifying access to a shared resource. For example, voltage may be reduced through circuits or gating, while clocks may be modulated, multiplied, divided, gated, or suppressed.

Note, that above, reference is made to high and low priority. However, any levels or number of levels of priority may be used. For example, there may be as little as two priority levels or as many priority levels as there are software entities. As an illustrative example, assume there are four priority levels for FIG. 1, where hypervisor 110 is at a priority level of one, i.e. the highest priority level, VM 105 is at the lowest priority of four, VM 106 is at a priority level of two, and VM 107 is at a priority level of three. Communication of software priority to hardware is discussed in more detail in co-pending application with Ser. No. 11/527,222.

In another embodiment, a software entity determines both the priority level of other software entities and assigns operating points to processing elements that are associated with the other software entities. For example, hypervisor 110, which may be a virtual machine monitor (VMM), both schedules instructions for low priority VM 105 on processing element 130 and determines processing element 130 is to modified/set to a low operating point. Here, the selected operating point for processing element 130 is written by VMM 110 to priority element 135, which may also be located in architecture state registers of PE 130. Manager 140 then enforces the operating point by modifying the appropriate power level, frequency level, or resource allocation level. Although a VMM is discussed in this example as the software entity to decide priority and operating points, any software entity, such as an operating system or specialized code, may determine priority levels and/or operating points.

In addition to determining an operating point based on priority level, manager 140 also potentially determines an operating point based on resource utilization. As above, manager 140, in one embodiment, is capable of controlling the rate of processing elements, as well as the allocation of hardware resources to the processing element. Therefore, manager 140's policies may not only take into account a software entities priority level, but also the software entities' affect on other priority software entities. As an example, if VM 105, i.e. virus scan software, is not affecting hypervisor 110 or other high priority application, i.e. utilizing too much of resource 145, such as power, frequency, cache, memory, or other resource, then power manager 140 may determine not to reduce PE 130's operating point. In contrast, if a priority level that includes VM 105 is utilizing too much of resource 145, then power manager 140 may reduce PE 130's operating point based both on the priority level of VM 105 and the utilization of resource 145.

Therefore, power/performance manager 140 may include any amount of logic centralized or distributed to determine priority of a software entity/processing element, determine a rate of a processing element, determine performance of a resource, set a rate of a processing element, set a performance allocation of a resource, implement a power/performance management policy, or a combination thereof.

In one embodiment resource 145 includes priority usage logic to indicate utilization of resource 145 associated with priority levels. Therefore, if a lower priority level is utilizing too much of resource 145, i.e. more than a predefined amount of resource 145, then the utilization logic is to indicate that over-utilization to manager 140. As a first example, utilization logic indicates to manager 140 how much of a power budget for processor 125 that PE 130 is utilizing. If that amount of power exceeds a threshold, such as 20%, then the power manager logic 140 determines if an operating point of PE 130 is to be modified. As VM 105 is a low priority application, manager 140 may reduce PE 130's operating point through any number of the aforementioned rate control or performance control mechanisms, if it is determined that PE 130's power consumption is affecting other higher priority software entities. Additional examples of rate control mechanisms include frequency scaling, clock modulation, clock suppression, instruction issuance throttling, memory issue throttling, or other source based rate modulation technique.

Another example of utilization logic includes memory bandwidth logic 151. As illustrated, logic 151 is located in hub 150 to track traffic on a memory interconnect associated with priority levels. Here, if too much memory bandwidth is utilized by a low priority level, then manager 140 may reduce bandwidth allocation to processing elements, such as processing element 130, which are associated with that lower priority level. Although pictured in hub 150, logic 151 may be present anywhere in hardware 120.

Figure 2A:
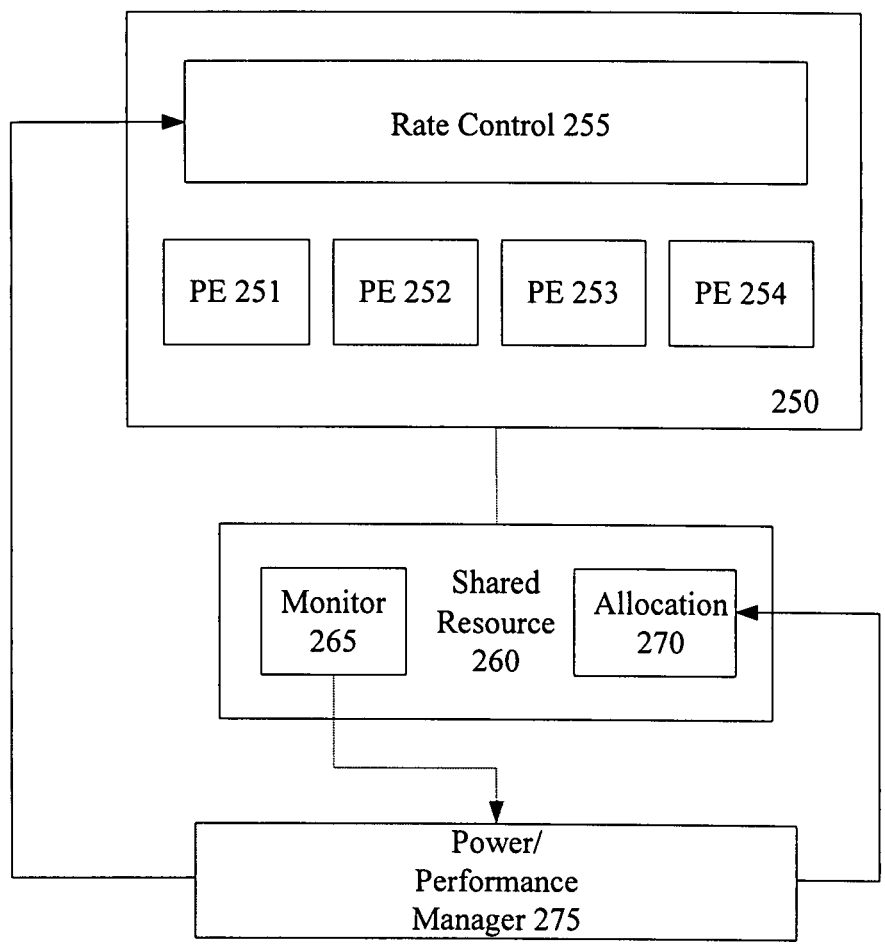
FIG. 2a illustrates an embodiment of power/performance logic capable of modifying rates of processing elements and allocation of a shared resource.

Turning to FIG. 2*a*, an embodiment of power/performance logic capable of controlling processing element rates and shared resource allocation. Here, rate control module 255 is to modify rates of processing elements (PEs) 251-254. For example, at the highest operating point PE 251 is set to a highest voltage, power, frequency, clocking, instruction issue capacity, and memory access capacity. However, when the operating point is modified to a lower operating point, one or more of the aforementioned rate based mechanisms may be reduced. For example, cycles of a clock for PE 251 may be suppressed. Note, that altering a resource for one PE of PEs 251-254 may affect the other PEs. Traditionally, common voltage rails are utilized for PEs 251-254; however, individual power rails may be supplied to allow for independent modulation of voltage to control the rate of a single PE without affecting the other PEs.

In addition to rate based mechanisms, power/performance manager 275 may also modify allocation of shared resource 260 to ensure adequate resource capacity for higher priority software entities. Here, monitor 265 is to track usage by different priority levels of shared resource 260. If a low priority is utilizing too much of shared resource 260, i.e. affecting other higher priority levels, then manager 275 may utilize rate control 255 to reduce utilization of shared resource 260 from the source, i.e. from a PE associated with the low priority level. In contrast, manager 275 may utilize allocation logic 270 to modify the allocation of shared resource 260 to a low priority.

To illustrate, assume PE 251 is associated with a low priority software entity and PE 252 is associated with a higher priority software entity. In one embodiment, PE 251, is by default, set to a lower operating point to save power. For example, manager 275 utilizes rate control 255 to reduce voltage and frequency to PE 251 to save power. In another embodiment, PE 251 is allowed to operate normally until it is detected by monitor 265 that the lower priority level is affecting the higher priority level performance. Here, monitor 265 determines the lower priority level is utilizing too much of shared resource 260. As a result, manager 275 sets PE 251, which is associated with the lower priority software entity, to a lower operating point.

Note from above, manager 275 may implement any policy for reducing an operating point. For example, manager 275 may utilize rate control mechanisms, such as voltage and frequency, as well as allocation mechanisms, such as allocation logic 270, to ensure PE 251 is only able to utilize a portion of shared resource 260. In other words, that the higher priority level is ensured utilization of at least a portion of shared resource 260. Shared resource 260 includes any resource shared by more than one processing element, such as a cache, memory, memory access mechanism, or other known shared hardware, firmware, or software.

Figure 2B:
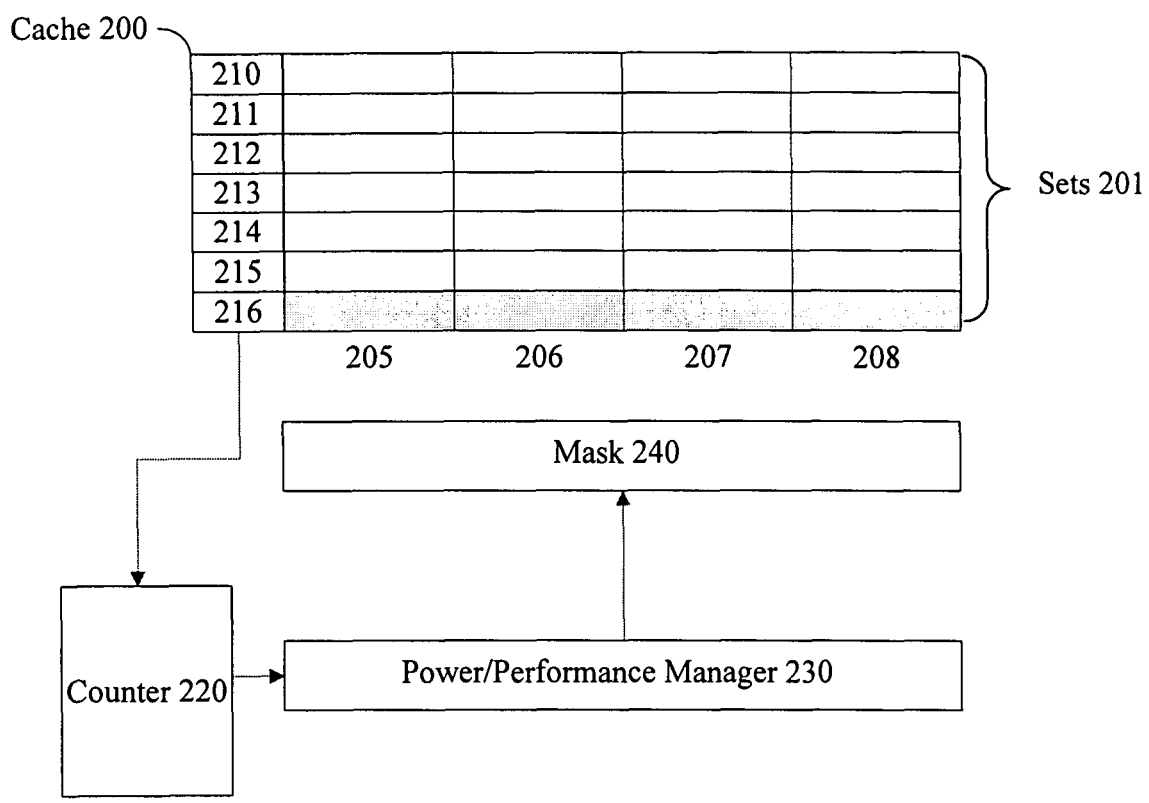
FIG. 2b illustrates an embodiment of power/performance logic capable of modifying rates of processing elements and allocation of a cache memory.

Turning to FIG. 2*b*, an embodiment of power/performance logic capable of modifying rates of processing elements and allocation of a cache memory is illustrated. Cache 200 may be organized in any manner, such as a direct mapped cache, a fully associated cache, or a set-associative cache. As illustrated, cache 200 is a set associative cache with K ways, i.e. four ways 205-208. Sets 201 includes the same offset location within each of the ways. Here, extra fields 210-216 are associated with each set of cache 200 to indicate the priority level associated with the locations within a corresponding set. Note extra fields may be utilized to track priority levels in any entries, such as locations, ways, sets, or other configurations.

In one embodiment, when a cache line associated with a first priority level is brought to cache 200, then counter 220 increments a count for the first priority level, and when a cache line associated with the first priority level is evicted the count is decremented. Therefore, a first number of entries associated with the first priority level are tracked. In a similar manner, utilization of cache 200 may be tracked for multiple priority levels. Based on the utilization levels of different priorities, as tracked by counter 220, manager 230 determines an operating point for the priority level, i.e. for the processing element associated with a software entity at the priority level.

As aforementioned, a rate of a source element, such as processing element associated with the lower priority cache lines, may be reduced to decrease the rate at which the source element utilizes cache 200. Separately or in addition to rate control, manager 230 may modify an allocation policy of cache 200. Here, a priority level associated with mask 240 is allowed access to portions of cache 200, i.e. a number of ways, as indicated by mask 240. For example, assume a low priority level is utilizing 75% of cache 200, which is affecting a high priority level software entity utilizing 25% of the cache.

Manager 230 sets mask 240 to a binary 1000, which represents that a processing element associated with the lower priority level may only access way 205 of cache 200. Alternatively, the operating point for the higher priority level may be maintained or increased. As an example, mask 240 may be set to a 1111, which represents a processing element associated with a higher priority software entity may access all ways of cache 200. As a result, a lower priority level is only allowed to access one way of cache 200, ensuring that the affected priority level has at least three ways of cache 200 to access without interference. In this example, allocation is performed through use of a mask for each priority level. However, any allocation policy and logic may be utilized to dedicate, limit, or restrict a portion of a cache based on priority. Tracking priority utilization of a cache is also discussed in more detail in copending application with Ser. No. 11/503,633.

Figure 3:
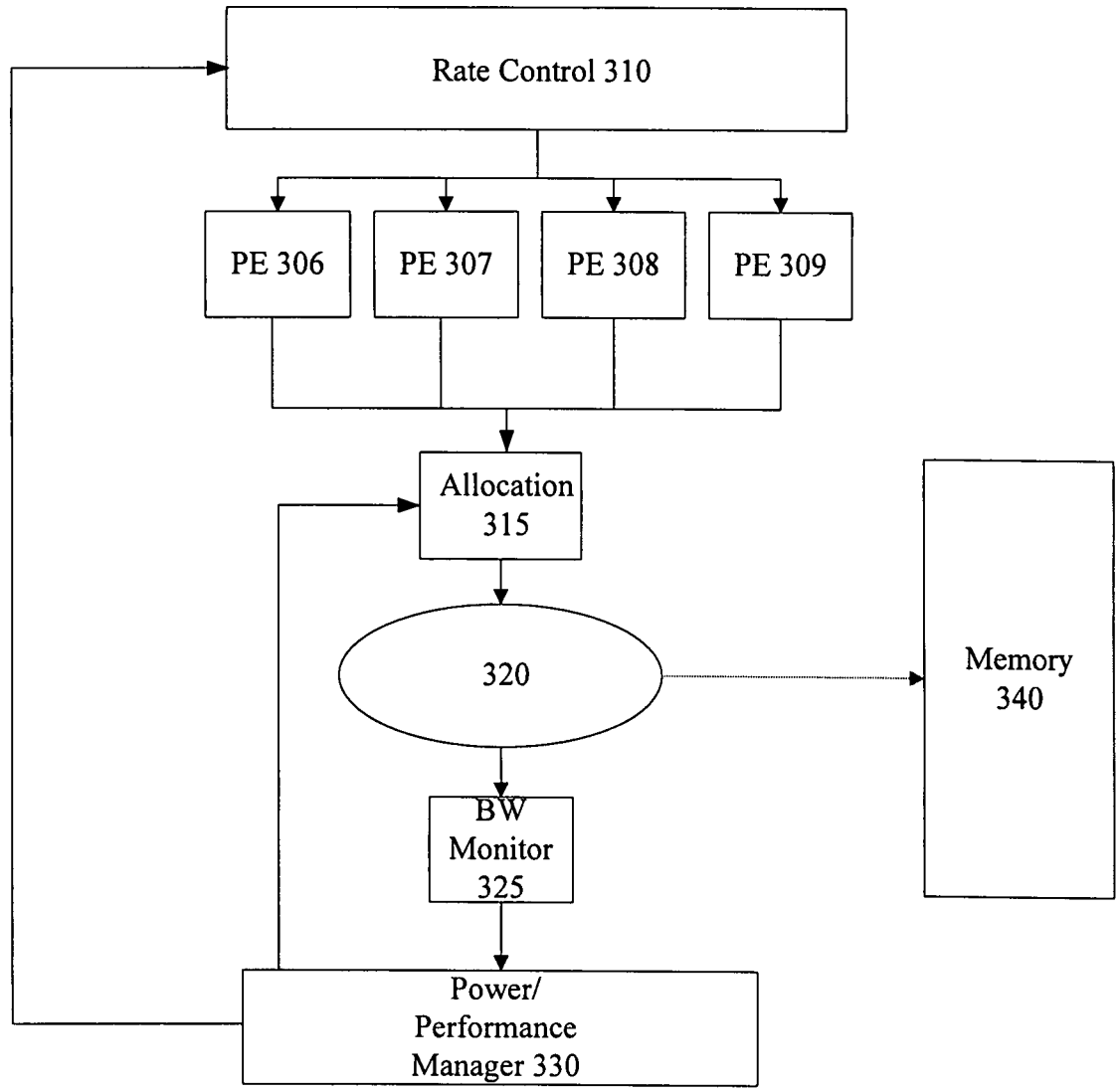
FIG. 3 illustrates an embodiment of power/performance logic capable of modifying rates of processing elements and allocation memory bandwidth.

Referring next to FIG. 3, an embodiment of power/performance logic capable of modifying rates of processing elements and allocation access to a device, such as a memory, is illustrated. Similar to a cache memory, separate or in addition to rate control, manager 330 may also modify access policies to shared devices within different operating points. Here, processing elements 306-309 utilize a ring priority to access memory 340, and allocation logic 315 is capable of allocating different amounts of bandwidth for memory accesses associated with different priority levels. Although, a ring access format is illustrated, tracking and allocating of accesses may be done in a similar manner for a serial interconnect or other.

In one embodiment, a credit or control priority queue is utilized for accesses to memory 340. A processing element, such as element 306, requests an access to memory. The access request is queued, and accordingly, a credit/token is issued to processing element 306 for an access to memory. As an example, bandwidth monitor 325 includes fields associated with the credit queue, which may be used to track priority levels and/or processing elements associated with memory accesses requests. Therefore, as above in FIG. 2, the number of misses to a higher level cache and/or accesses to memory may be tracked by the number of credits requested that are associated with a priority level.

As another example, bandwidth monitor 325 includes a counter to be associated with each priority level. For every access from a specific priority level, the associated counter is incremented. Over a predetermined amount of time, if the counter reaches a threshold value for the associated priority level, then manager 330 is notified. Any other known logic for tracking memory bandwidth, usage, or access may be utilized in bandwidth monitor 325.

When manager 330 is notified a lower priority level is utilizing too much memory bandwidth, then it may modify the rate of PEs 306-309 and/or modify the allocation of bandwidth to PEs 306-309 accordingly. For example, performance manager 330 and allocation logic 315 bias a credit or control priority queue to allow fewer credits/tokens to a processing element, such as processing element 306, associated with the lower priority level. In addition, the rate of PE 306 may also be altered, such as decreasing the amount of memory accesses requested at the source by reducing the number of instructions issued per cycle or reducing PE 306's frequency.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a processor including:
   a first processing element of a plurality of processing elements adapted to be associated with a first software entity of a plurality of software entities;
   monitor logic adapted to determine a utilization of a shared resource by the first processing element, the shared resource adapted to be shared by the plurality of processing elements; and
   priority aware management logic adapted to receive a priority level of the first software entity and to determine an operating point of the first processing element within the priority level based on the priority level of the first software entity and the utilization of the shared resource by the first processing element, wherein the operating point is to include a combination of a rate level of the first processing element and an allocation of a shared resource to the first processing element, wherein priority aware management logic further includes allocation control logic adapted to modify an allocation of a shared resource to the first processing element independent from allocation of the shared resource to the plurality of processing elements other than the first processing element, and wherein the allocation control logic includes resource control logic adapted to modify an amount of cache memory in size that the first processing element is allowed to access.

2. The apparatus of claim 1, wherein the first processing element is selected from a group consisting of a core, a thread, and a context.

3. The apparatus of claim 1, wherein priority aware management logic includes rate control logic adapted to modify the rate level of the first processing element independent from rate levels for the plurality of processing elements other than the first processing element.

4. The apparatus of claim 3, wherein rate control logic adapted to modify the rate level of the first processing element includes voltage control logic adapted to modify a voltage level of the first processing element.

5. The apparatus of claim 3, wherein rate control logic adapted to modify the rate level of the first processing element includes clock control logic adapted to modify a clock associated with the first processing element.

6. The apparatus of claim 3, wherein rate control logic adapted to modify the rate level of the first processing element includes frequency control logic adapted to modify a frequency of the first processing element.

7. The apparatus of claim 3, wherein allocation control logic adapted to modify the allocation of the shared resource to the first processing element includes includes memory allocation logic adapted to modify a memory access rate of the first processing element.

8. The apparatus of claim 3, wherein allocation control logic adapted to modify the allocation of the shared resource to the first processing element includes instruction logic adapted to modify an instruction issue rate of the first processing element.

9. The apparatus of claim 1, wherein the resource is a memory, and wherein to modify a utilization amount of the resource includes modifying an amount of accesses to the memory.

10. The apparatus of claim 1, wherein the first software entity is selected from a group consisting of an operating system, a virtual machine monitor (VMM), a virtual machine (VM), a user-level application, and guest software.

11. An apparatus comprising:
a processor including:
a first processing element adapted to execute a first software entity;
a second processing element adapted to execute a second software entity;
storage adapted to hold a first priority level associated with the first software entity and a second priority level associated with the second software entity, wherein the first priority level is higher than the second priority level;
monitor logic adapted to monitor utilization of a shared resource by the first processing element and the second processing element; and
a priority aware manager adapted to set a first operating point of the first processing element to a higher operating point than a second operating point of the second operating element based on the first priority level being higher than the second priority level and the utilization of the shared resource by the first and second processing elements in relation to the first and second priority levels, wherein the first operating point of the first processing element includes access to a first number of ways of a cache memory and the second operating point of the second processing element includes access to a second number of ways of the cache memory, the first number of ways being greater than the second number of ways.

12. The apparatus of claim 11, wherein the first operating point includes the first processing element at a higher rate than the rate of the second processing element at the second operating point.

13. The apparatus of claim 11, wherein the first and second processing elements are cores, and wherein the first operating point includes a first voltage and a first frequency that are higher than a second voltage and a second frequency of the second operating point.

14. An apparatus comprising:
a processor including:
priority usage logic adapted to indicate utilization of a resource associated with a first priority level and utilization of the resource associated with a second priority level, wherein the first priority level is lower than the second priority level; and
priority aware management logic coupled to the priority usage logic adapted to reduce an-a first operating point of a first processing element, which is to be associated with a first software entity of the first priority level executed by a first processing element, in response to the utilization of the resource associated with the first priority level being above a predefined utilization amount, wherein the first operating point of the first processing element includes a first number of credits to access a memory and a second operating point of a second processing element that executes a second software entity associated with a second priority level includes a second number of credits to access the memory, the first number of credits being greater than the second number of credits.

15. The apparatus of claim 14, wherein the first operating point of the first processing element includes a first rate of the first processing element, and the second operating point of the second processing element includes a second rate of the second processing element, the first rate being greater than the second rate.

16. The apparatus of claim 14, wherein the first operating point of the first processing element includes a first allocation amount of the resource, and the second operating point of the second processing element includes a second allocation amount of the resource, the first allocation amount being greater than the second allocation amount.

17. The apparatus of claim 14, wherein the first operating point of the first processing element includes access to a first portion of a cache memory and the second operating point of the second processing element includes access to a second portion of the cache memory, the first portion being greater than the second portion.

18. The apparatus of claim 17, wherein the priority usage logic includes tracking logic to track a first number of entries in the cache memory associated with the first priority level and a second number of entries associated with the second priority level.

19. The apparatus of claim 14, wherein the priority usage logic includes tracking logic to track a third number of credits issued to the first processing element for accessing the memory and a fourth number of credits issued to the second processing element for accessing the memory.

* * * * *